(12) United States Patent
Crook

(10) Patent No.: US 6,719,037 B2
(45) Date of Patent: Apr. 13, 2004

(54) RESILIENTLY BONDED HEAT EXCHANGER

(75) Inventor: Richard F. Crook, Charlestown, RI (US)

(73) Assignee: Transpro, Inc., New Haven, CT (US)

( * ) Notice: Subject to any disclaimer, the term of this patent is extended or adjusted under 35 U.S.C. 154(b) by 122 days.

(21) Appl. No.: 09/847,144

(22) Filed: May 2, 2001

(65) Prior Publication Data

US 2002/0162648 A1 Nov. 7, 2002

(51) Int. Cl.⁷ .................................................. F28F 9/04
(52) U.S. Cl. ........................ 165/79; 165/178; 165/69; 29/890.043
(58) Field of Search ................. 165/69, 79, 178; 29/890.043

(56) References Cited

U.S. PATENT DOCUMENTS

| | | | |
|---|---|---|---|
| 3,447,603 A | * | 6/1969 | Jones .......................... 165/178 |
| 3,633,660 A | * | 1/1972 | Young .......................... 165/69 |
| 3,993,126 A | * | 11/1976 | Taylor .......................... 165/173 |
| 4,044,443 A | | 8/1977 | Chartet |
| 4,159,035 A | * | 6/1979 | Chartet .......................... 165/173 |
| 4,295,522 A | * | 10/1981 | Frei .............................. 165/79 |
| 4,691,769 A | * | 9/1987 | Flamm et al. .............. 165/158 |
| 4,730,669 A | | 3/1988 | Beasley et al. |
| 4,744,505 A | | 5/1988 | Calleson |
| 4,756,361 A | | 7/1988 | Lesage |
| 4,858,686 A | | 8/1989 | Calleson |
| 4,997,035 A | | 3/1991 | Beatenbough et al. |
| 5,052,475 A | | 10/1991 | Grundy |
| 5,205,354 A | | 4/1993 | Lesage |
| 5,226,235 A | | 7/1993 | Lesage |
| 5,407,004 A | | 4/1995 | DeRisi et al. |
| 5,538,079 A | | 7/1996 | Pawlick |
| 5,551,507 A | | 9/1996 | Vogel |
| 5,604,982 A | | 2/1997 | Kent et al. |
| 5,605,191 A | | 2/1997 | Eto et al. |
| 5,787,973 A | | 8/1998 | Kado et al. |
| 5,894,649 A | | 4/1999 | Lambert et al. |
| 6,082,439 A | * | 7/2000 | Kato et al. ..................... 165/79 |

FOREIGN PATENT DOCUMENTS

| | | | |
|---|---|---|---|
| GB | 29777 | 12/1912 | |
| JP | 6-235595 A | * 8/1994 | ............. F28F/9/18 |

* cited by examiner

Primary Examiner—Allen Flanigan
(74) Attorney, Agent, or Firm—DeLio & Peterson LLC; Peter W. Peterson

(57) ABSTRACT

A heat exchanger and method of making a heat exchanger which includes providing a header having openings adapted to receive a plurality of tubes. The tubes are inserted into the header openings, then, substantially uncured fluid sealing material is applied to at least the inner surfaces of the header openings. The inner surfaces of the header openings and the outer surfaces of the tubes are connected by the sealing material. The method further includes curing the sealing material after the tubes are inserted into the header openings. The sealing material thus provides a flexible, bonded, liquid tight, tube-to-header joint.

14 Claims, 8 Drawing Sheets

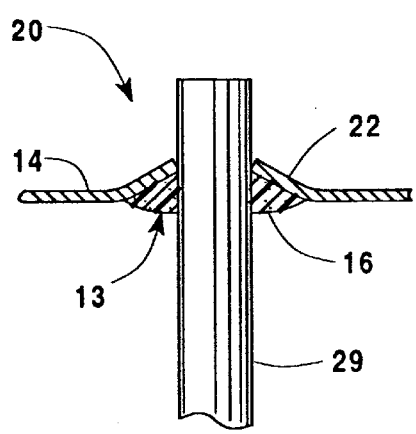 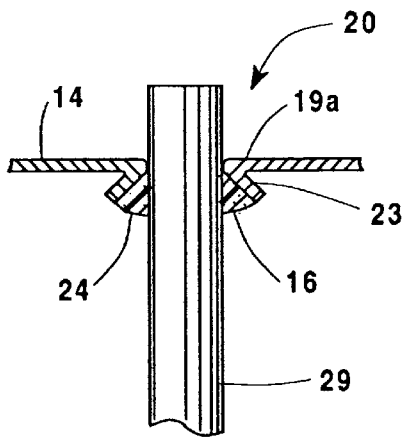
Fig. 2A          Fig. 2B
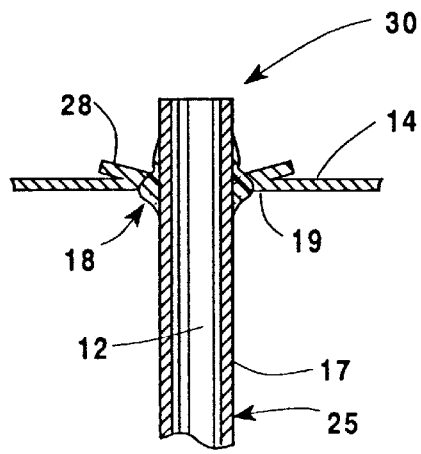
Fig. 3A
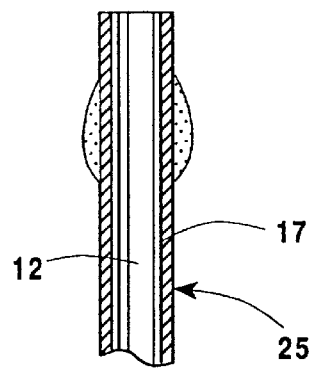
Fig. 3C
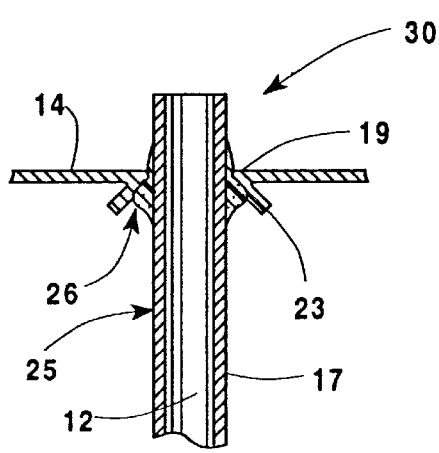
Fig. 3B

RESILIENTLY BONDED HEAT EXCHANGER

CROSS-REFERENCE TO RELATED APPLICATIONS

Aspects of the present invention are related to subject matter disclosed in co-pending applications entitled "Heat Exchanger Assembly Utilizing Grommets and Integral Cast Tanks," Ser. No. 08/920,304, filed on Aug. 28, 1997, now U.S. Pat. No. 5,894,649, and "Welded Heat Exchanger With Grommet Construction," Ser. No. 09/266,206, filed on Mar. 10, 1999, now U.S. Pat. No. 6,247,232, and assigned to the assignee of the present invention, the subject matter of which is hereby incorporated by reference.

BACKGROUND OF THE INVENTION

1. Field of the Invention

This invention relates to heat exchangers and, more particularly, to heat exchangers utilizing tube-to-header joints.

2. Description of Related Art

Heat exchangers of many types, such as radiators, charge air coolers, oil coolers and the like, suffer limited life as a result of high working stresses at their tube-to-header joints. These stresses are a result of thermal expansion and contraction of the tubes, thermal changes in header length, and variations in internal pressure during operation. Since the tubes are usually rigidly attached to a relatively inflexible header by means of soldering, brazing, welding or the like, the resulting stresses ultimately lead to joint fatigue failure or tube fatigue in the area next to the joint.

In an effort to minimize or eliminate the stresses described above, some heat exchangers have been made with grommeted tube-to-header joints. In such heat exchangers, tube openings in the headers are made to be oversize with respect to the tubes. These openings are fitted with resilient grommets, usually made of high temperature silicone rubber. The grommets have slightly smaller openings than the tubes, so that when the tubes are pushed through the grommets the compression fit provides a leak-free connection of each tube to the header. The heat exchanger assembly involves the tedious handling of numerous small parts (the grommets), and lacks any real bond between the tubes and the headers, relying solely on the compression fit to provide a seal. To achieve the desired compression fit with the grommets, the fit and alignment of the core tubes to the grommeted header openings must be critically maintained through close dimensional tolerances. A major disadvantage of this design is that sealing is dependent on providing and maintaining a compression fit between the grommet, tube, and header.

Heat exchangers have also been made with specially made resilient headers. In such heat exchangers, a rigid metal header with oversized tube openings accepts loosely fitted brass ferrules in each tube opening. The brass ferrules are then bonded to the metal header by molding silicone rubber around each ferrule. The brass ferrules are later soldered to brass heat exchanger tubes.

The disadvantages of specially made resilient headers include the substantial amount of skill and labor required to solder the tubes and headers together. Further, great care must be exercised in the soldering operation to prevent destruction of the silicone bond to the ferrules. Also, the specially molded resilient headers are extremely expensive to produce.

Bearing in mind the problems and deficiencies of the prior art, it is therefore an object of the present invention to provide a method of manufacturing a heat exchanger having long-life properties.

It is another object of the present invention to provide a method of manufacturing a heat exchanger with resilient headers or resilient tube-to-header joints.

It is a further object of the present invention to provide a method of manufacturing a heat exchanger having long-life properties and which is substantially simpler to manufacture.

It is another object of the present invention to provide a method of manufacturing a heat exchanger which requires fewer parts.

It is a further object of the present invention to provide a method of manufacturing a heat exchanger which requires less critical dimensional tolerances.

It is yet another object of the present invention to provide a method of manufacturing a heat exchanger which provides improved joint integrity.

It is still another object of the present invention to provide a method of manufacturing a heat exchanger which is easier to assemble.

It is another object of the present invention to provide a method of manufacturing a heat exchanger which provides a resilient tank to header joint.

It is a further object of the present invention to provide a heat exchanger which includes a resiliently bonded tube-to-header joint.

It is another object of the present invention to provide a heat exchanger which includes a sealing joint using compression and bonding.

It is another object of the present invention to provide a heat exchanger which includes a resilient joint including a bonded grommet.

It is another object of the present invention to provide a heat exchanger which includes a resilient tank to header joint.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of making a heat exchanger by initially providing a header defining openings. The header openings are adapted to receive a plurality of tubes having outer surfaces. The tubes are inserted into the header openings such that the inner surfaces of the header openings and the outer surfaces of the tubes are adjacent to each other. Then, substantially uncured fluid sealing material is applied to at least the inner surfaces of the header openings such that the inner surfaces of the header openings and the outer surfaces of the tubes are connected by the sealing material. Finally, the method includes curing the sealing material after the tubes are inserted into the header openings, the sealing material provides a flexible, bonded, liquid tight, tube-to-header joint.

Preferably, the sealing material is an elastomer, and is cured by room temperature vulcanization or by ultraviolet light. The sealing material may be a liquid applied to the outer surface of the tubes. The inner surface of the header opening and the outer surface of the tubes frictionally fit in one preferred embodiment.

In another embodiment of the present invention a gap is defined by the inner surfaces of the header openings and the outer surfaces of the tubes, and the fluid sealing material is applied in the gap. In such case, the sealing material is essentially uncompressed after the curing.

The method may further include providing a tank having an inner cavity. The tank may be attached to or integral with the header such that the tubes extend through the header openings and open ends of the tubes communicate with the tank inner cavity.

Another aspect of the present invention relates to a method of making a heat exchanger by initially providing a header having openings. The header openings are adapted to receive a plurality of tubes. Then, the method includes providing a tank having an inner cavity. The tank is attached to the header. Next, the method includes inserting the tubes into the header openings and fixedly attaching the tubes to the header such that the tubes extend through the header openings and the open ends of the tubes communicate with the tank inner cavity. Then, the method includes applying substantially uncured fluid sealing material between the tank and the header defining a joint such that the header and the tank are connected by the sealing material. Finally, the method includes curing the sealing material of the joint such that the sealing material provides a flexible, bonded, liquid tight, header-tank joint. The tubes may be attached to the header by brazing.

A further aspect of the present invention provides a method of making a heat exchanger which initially provides a header defining openings having inner surfaces. The header openings are adapted to receive a plurality of tubes having outer surfaces. The method includes applying substantially uncured fluid sealing material to at least the inner surfaces of the header openings. Then, the method includes curing the sealing material, preferably by room temperature vulcanization or ultraviolet light, before the tubes are inserted into the header openings. The cured sealing material provides elastomeric members bonded to the inner surfaces of the header openings adapted to receive the tubes. Then, the tubes are inserted into the header openings such that the inner surfaces of the header openings and the outer surfaces of the tubes are adjacent to each other and are connected by the elastomeric members to provide a flexible, liquid tight, tube-to-header joint. The elastomeric members may be compressed by the tubes to provide the flexible, liquid tight, tube-to-header joint. The elastomeric member includes an internal dimension which may be defined and formed using a Teflon mandrel. The internal dimension preferably is less than an outer dimension of the tube, thereby providing a compression sealing fit between the elastomeric member and the tube.

Yet another aspect of the present invention provides a method of making a heat exchanger comprising an initial step of providing a header defining openings having an inner surface. The method further includes providing a plurality of grommets which may include cured silicone rubber. The grommets define openings having inner surfaces and are adapted to receive a plurality of tubes. The grommets are adapted to fit into the openings in the header. Then, the method includes inserting the tubes into the grommet openings such that the inner surfaces of the grommet openings and outer surfaces of the tubes are adjacent to each other. Next, the method includes applying substantially un-cured sealing material to at least the inner surfaces of the grommets openings such that the inner surfaces of the openings of the grommets and the outer surfaces of the tubes are connected by the sealing material. Finally, the method includes curing the sealing material after the tubes are inserted into the grommet openings, the sealing material provides a flexible, bonded, liquid tight, tube-to-grommet joint. The grommet may be bonded to the header, or bonded to both the header and the tube outer surface.

A related embodiment of the present invention provides a tank having an inner cavity. The tank defines an opening adapted to receive the tubes. The tank is attached to or integral with the header such that the tubes extend through the grommets and the tank opening. The open ends of the tubes communicate with the tank inner cavity. The outer surfaces of the tubes may be attached to the header to form a flexible tube-to-header joint, or may also be substantially rigidly attached. The tank and the header may be attached by a flexible bond to provide a tank-to-header joint which may include a silicone adhesive and is adapted to accommodate thermal expansion of the tubes.

Another aspect of the present invention relates to a method of making a heat exchanger comprising an initial step of providing a header defining openings having an inner surface. The header openings are adapted to receive a plurality of tubes having outer surfaces. The method further includes providing a structure defining openings. The structure openings have an inner surface and are adapted to receive the plurality of tubes. The structure openings are aligned with the header openings to mutually receive the plurality of tubes. A sealant member, preferably including silicone, having at least one bonding surface is positioned between the structure and the header such that the sealant member is adjacent to the outer surfaces of the tubes. Then, the method includes inserting the tubes into the header openings such that the inner surface of the header openings, the inner surface of the structure openings, and the bonding surface of the sealant member are adjacent to each other. Next, the method includes compressing the sealant member between the structure and the header such that the header and the tubes are connected by the bonding surface of the sealant member. Finally, the method includes curing the sealant member after the tubes are inserted into the header openings, thus, the sealant member provides a flexible, bonded, liquid tight, tube-to-header joint.

In a related aspect of the present invention, the method provides a sealant member which may include a first portion of uncured silicone and a second portion of cured silicone. The first portion is positioned toward the header and the tube outer surface such that the first portion is touching the tube outer surface and the header after the sealant member is compressed. Then, the uncured silicone of the first portion of the sealant member is cured.

A related embodiment provides a plurality of grommets defining openings having inner surfaces and adapted to receive the plurality of tubes. The grommets are adapted to fit into the openings in the header, and the tubes are inserted into the grommets in the header openings. The grommets may be bonded to both the tubes and the header.

A further aspect of the present invention provides a heat exchanger which comprises a plurality of tubes having predetermined dimensions. The tubes include an outer surface and are open at one end. A header structure defines a plurality of openings where the openings are adapted to receive the tubes. A plurality of elastomeric sealing joints preferably including a silicone bonding material, are positioned between the outer surface of the tubes and the header, where the sealing joints are bonded to the outer surface of the tubes and the header.

Yet another aspect of the present invention provides a heat exchanger which comprises a header defining openings having inner surfaces. The header openings are adapted to receive a plurality of tubes, and the tubes are inserted through the header openings. A cured-in-place seal is provided between the tubes and the header. The cured-in-place seal may include an internal dimension smaller than an outer dimension of the tubes to provide a compression sealing fit between the tubes and the cured-in-place seal. The seal is bonded to the header providing an elastomeric compression sealing fit between the tube and the seal. In a related aspect, the internal dimensions of the cured-in-place seal may be formed using a Teflon™ mandrel.

Another aspect of the present invention provides a heat exchanger which comprises a header defining openings. The header openings are adapted to receive a plurality of tubes, and the tubes are inserted through the header openings. The heat exchanger includes a cured-in-place seal preferably including silicone between the tubes and the header. The seal is bonded to the tube, and the seal provides an elastomeric compression sealing fit between the header and the seal.

In a related embodiment of the present invention, the heat exchanger may further comprise a tank being integral with the header.

Yet another aspect of the present invention provides a heat exchanger comprising a plurality of tubes having predetermined dimensions. The tubes include an outer surface and are open at one end. A header structure defines a plurality of openings which receive the tubes. A tank is attached to the header structure. The tank includes openings which are adapted to receive the tubes. A sealing member which may include silicone bonding material bonds the tubes to the header.

In a related embodiment of the present invention, the heat exchanger includes a gap between the header and the tank. The sealing member includes a bond of the silicone bonding material between the tank, the header, and the tubes.

Another aspect of the present invention includes a heat exchanger which comprises a plurality of tubes having predetermined dimensions. The tubes include an outer surface and are open at one end. A header structure defines a plurality of openings. The openings are adapted to receive the tubes. A plurality of elastomeric grommets are positioned circumferentially about the outer surface of the tubes. The grommets have at least one bonding portion of sealing material which may include silicone bonding material, adjacent to the tubes and the header. A plurality of sealing joints are provided which include the sealing material of the grommet bonded to the header and the tube.

A further aspect of the present invention provides a heat exchanger which comprises a plurality of tubes having predetermined dimensions. The tubes include an outer surface being open at one end. A header structure defines a plurality of openings which receive the tubes, and the tubes may be fixedly attached to the header structure by brazing. A tank is positioned above the header structure. The tank and the header structure define a gap between the header structure and the tank. The gap is adapted to receive bonding material which provides a sealing member from curing the bonding material to form a flexible bond between the tank and the header structure.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIGS. 2a–2b are partial cross-sectional views of another embodiment of a tube to header sealing joint.

FIGS. 3a–3c are partial cross-sectional views of another embodiment of a tube to header sealing joint, before and after insertion of the tube.

DESCRIPTION OF THE PREFERRED EMBODIMENT(S)

Figure 1A:
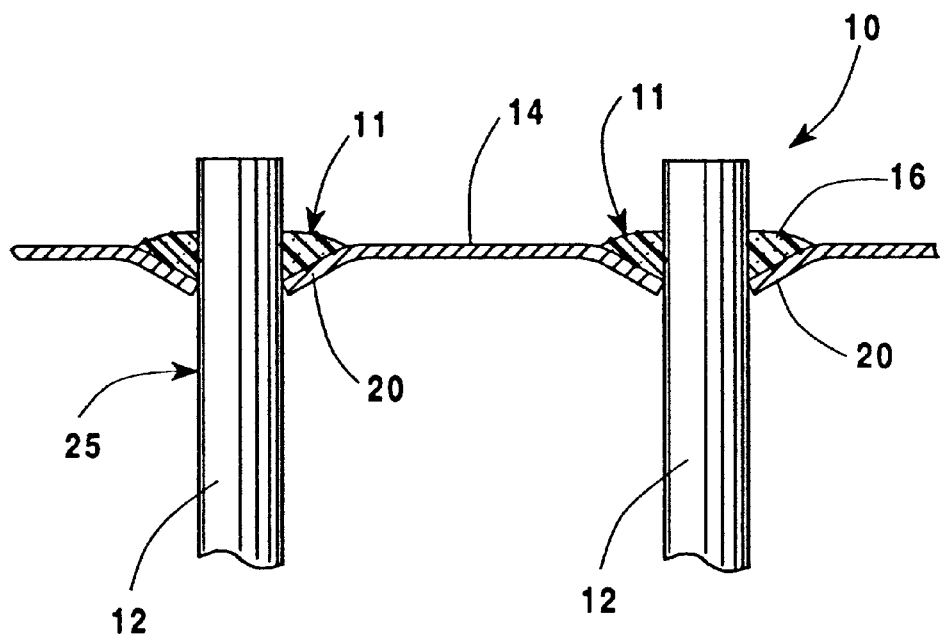
FIGS. 1a–1d are partial cross-sectional views of a first embodiment of a tube to header sealing joint.

In describing the preferred embodiments of the present invention, reference will be made herein to FIGS. 1–10 of the drawings in which like numerals refer to like features of the invention. Features of the invention are not necessarily shown to scale in the drawings.

Generally, the present invention provides a method of producing flexible liquid tight seals using formed in place and cured in place techniques. The seal can be provided in a tank-to-header joint or a tube-to-header joint. Curing the seal after the assembly of the parts has specific advantages including providing a bonded liquid tight sealing joint instead of a compression fit sealing joint, and enhanced ease of assembly. Moreover, other advantages using the present invention include the expansion and contraction of the flexible joints when other components of the heat exchanger are also expanding and contracting. Also, the flexible nature of the joints provides a long life heat exchanger. Further, the present invention provides a method for creating flexible liquid tight seals after the components are assembled. Also, a heat exchanger is provided where the grommet is sealed to the tube and header providing a liquid-tight joint.

Referring to FIGS. 1–10, all the embodiments of the present invention use high temperature silicone sealants to form joint seals of either the formed-in-place or cured-in-place types. Cured-in-place seals are created by applying sealing material (typically high temperature silicone sealants) as a liquid to a sealing surface of one part, and then curing the sealing material, usually by ultraviolet light, resulting in an elastomeric material bonded to the surface before assembly of the part to another part. Sealing is accomplished during assembly by compression of the cured elastomeric material between the sealing surface of the first part and the sealing surface of the second part. Thus, the parts are assembled with the silicone in a cured condition, but already bonded to one sealing surface. Loctite 5960 FastGasket silicone is an example of such a U/V-cured material.

In contrast, formed-in-place seals are created by applying sealing material (high temperature silicone sealants) as a liquid to one or both sealing surfaces, typically after assembly of the parts. Then, the sealing material is cured, usually by room temperature vulcanization (RTV), but also by the use of ultraviolet light or heat. Sealant can also be applied before assembly of the parts and cured after the components are assembled. Loctite 5920 Ultra Copper™ RTV, is an example of an RTV silicone material with a working temperature range of −65 F. to +600 F.

The present invention, shown in FIGS. 1–10, and described herein, provides a bonded, resilient, liquid-tight positive seal or sealing joint that can be used with the aforementioned heat exchangers described in the Background of The Invention. It may also be incorporated with any existing or new grommet design to assure a positive bonded seal. The application of the seals includes tube to header joints and header to tank joints. Producing a liquid-tight flexible seal may be done before or after assembly depending on the embodiment.

Heat exchangers related to the present invention are disclosed in U.S. Pat. Nos. 4,858,686 and 4,744,505, which patents are hereby incorporated by reference.

Figure 1B:
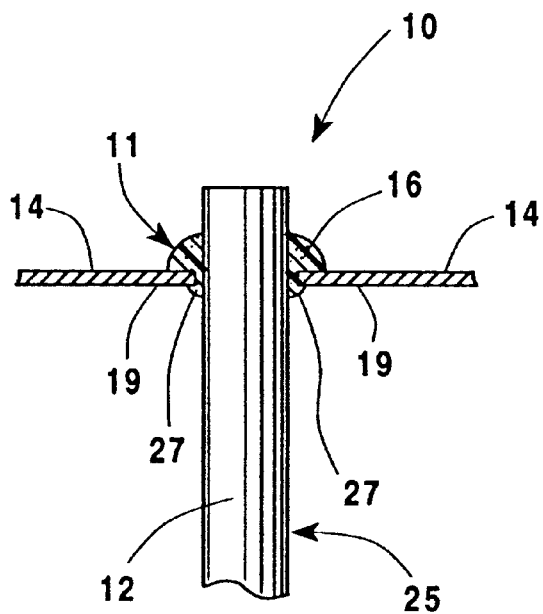
Figure 1C:
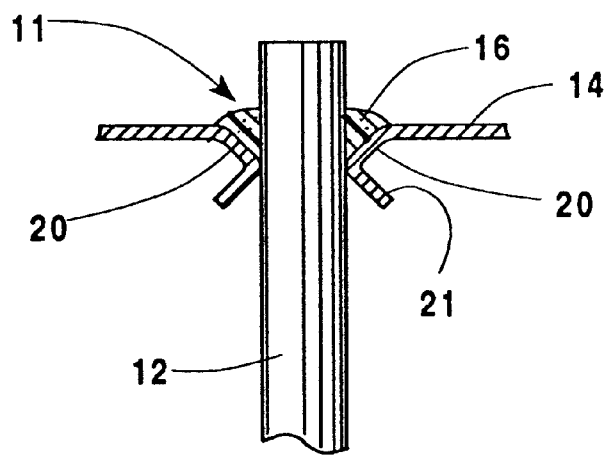

Referring to FIGS. 1a–1c, various header configurations are shown to which a cured-in-place or formed-in-place silicone bead is applied. The joint assembly 10 includes tubes 12, header 14, and the applied silicone bead 16. The header includes holes or openings which are slightly larger than the tube diameter.

In FIGS. 1a and 1c the header 14 also includes a first angular portion 20 adapted to receive the silicone bead 16. Liquid silicone is applied to the top surface of the first angular portion 20 before or after insertion of the tubes 12. When the silicone is applied before the tube is inserted the silicone is cured-in-place before the tube is inserted. The direction of the angular portion 20 enables greater build-up of silicone between the tube and the header resulting in more surface area of the silicone bead 16 being in contact with the tube 12 outer surface 25. The bead 16 is adjacent to the tube 12 and frictionally secures the tube 12.

Figure 1D:
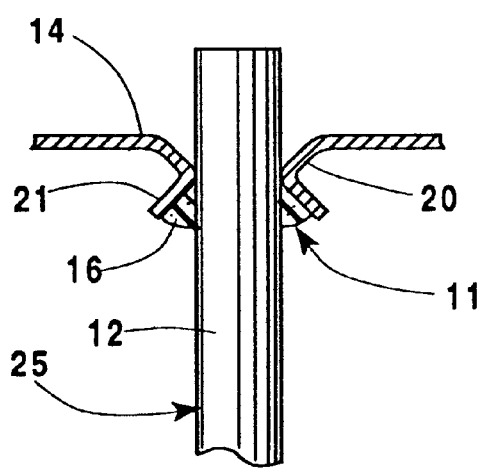

In FIG. 1c and 1d, the header 14 also includes a second angular portion 21 extending outwardly from the first angular portion 20. In FIG. 1d the silicone bead 16 is positioned beneath the second angular portion 21 and cured-in-place to form a joint 11 between the outer surface 25 of the tube 12 and the second angular portion 21. More specifically, liquid silicone is applied to the underside or fin-side of the second angular portion 21 and then cured-in-place. The resulting silicone bead 16 defines an opening which is slightly smaller than the diameter of the tube 12. After insertion of the tube 12 a silicone joint 11 is formed by compression between the silicone bead 16 and the outer surface 25 of the tube 12.

In FIG. 1b, the header 14 includes straight portions 19 defining the slightly oversized opening. The silicone bead 16 is positioned on the top surface of the straight portion 19 of the header 14 by applying liquid silicone to the area adjacent to the tubes and curing the silicone in place before assembly. A small portion of the liquid silicone passes through the opening in the header and is cured with the bead 16 to form a cured silicone portion 27 on the bottom of the straight portion 19 of the header 14. The bead 16 and portion 27 define a header opening which is slightly smaller than the diameter of the tube 12. After the tube 12 is inserted through the opening, the bead 16 and portion 27 form a compression fit sealing joint 11 with outer surface 25 of the tube 12.

Alternatively, for a formed-in-place seal, the tube and header are assembled before applying and curing the liquid silicone on the top surface of the straight portion 19 of the header 14 and beneath the header 14 to form the silicone bead 16 and the portion 27. The cured bead 16 and portion 27 form a joint 11 between the outer surface 25 of the tube 12 and the header 14.

The method of the present invention includes, referring to FIGS. 1a–1c, using cured-in-place or formed-in-place seals. When a cured-in-place seal is used, FastGasket (Loctite #5960) liquid sealant material is applied to the first angular portion 20 of the header, or as shown in FIG. 1b, to the straight portion 19 of the header 14. The liquid sealant material is then cured before assembly to form the beads 16 on the first angular portion 20, or straight portion 19 of the header 14. The header hole defined by the beads 16 is slightly smaller than the diameter of the tubes 12. The headerless core tubes 12 are inserted through the header holes to form a compression fit sealing joint 11 between the tubes 12 and the bead 16 on the header 14.

As shown in FIG. 1d, the liquid sealant material is cured-in-place before assembly to form beads 16 beneath the second angular portion 21. The header hole defined by the bead 16 is slightly smaller than the diameter of the tube 12. When the tubes 12 are inserted through the header hole, a liquid tight joint 11 is formed between the tube 12 and the bead 16 from the compression between the tube 12 and the bead 16, similar to the embodiments shown in FIGS. 1a–1c.

Alternatively, as shown in FIGS. 1a–1c, a formed-in-place seal method includes assembling the tubes and the header by inserting the tubes into the oversized header holes. Then, liquid silicone is applied between the first angular portion 20 and the outer surface 25 of the tube 12 or between the outer surface 25 and the straight portion 19 of the header 14. The silicone is then cured using the formed-in-place process resulting in silicone beads 16 which are bonded to the outer surface 25 of the tube 12. The sealing joint 11 is formed by the cured silicone bead 16 between the outer surface 25 of the tube 12 and the angular portion 20 or straight portion 19 of the header 14.

FIGS. 2a and 2b illustrate a method for creating a cured-in-place seal with a controlled internal diameter. Referring to FIGS. 2a–2b, the joint assembly 20 is shown including a mandrel 29, preferably made of TEFLON™ or another non-stick material. As shown in FIG. 2a, the header 14 has an upwardly extending angular portion 22. The joint assembly 20 uses the mandrels 29 to control the internal diameter of the FastGasket bead 16 during application and curing. The mandrel 29 defines an opening slightly smaller than the diameter of the tube which will be inserted into the opening later, after the mandrel 29 is removed. To create a cured-in-place seal, liquid silicone is placed beneath the upwardly extending portions 22 and cured. The resulting silicone bead 16 is positioned beneath the upwardly extending angular portion 22 of the header 14, and similar to the mandrel 29, defines an opening slightly smaller than the diameter of the tube which will be inserted into the opening later. The tube 12 (not shown) is later inserted through the opening forming a compression fit tube-to-header joint 13.

In FIG. 2b a header 14 is shown having a straight portion 19a, and further including an angular portion 23 extending downwardly at an acute angle from the header 14 straight portion 19a. The mandrel 29 again defines an opening slightly smaller than the diameter of the tube which will later be inserted into the opening. Using the same process as in the embodiment shown in FIG. 2a, the silicone bead 16 is positioned beneath the angular portion 23 and defines, similar to the mandrel 29, an opening slightly smaller than the diameter of the tube which will later be inserted into the opening. When the tube 12 (not shown) is later inserted through the opening, a liquid tight compression fit joint 24 between the header 14 and tube 12 results.

The method of the present invention includes, referring to FIGS. 2a–2b, using a cured-in-place seal resulting in a tube-to-header joint 13, 24, respectively. The liquid silicone is applied beneath the angular portions 22, 23 and then cured to form silicone beads 16. The tubes 12 (not shown) are inserted through the opening defined by the beads 15 and the mandrel 29, which is slightly smaller than the diameter of the tube 12, resulting in compression fit liquid tight sealing joints 13, 24 between the headers 14 and the tubes 12.

Referring to FIGS. 3a–3c a joint assembly 30 is shown which includes the tube 12 and the header 14 shown in FIGS. 1–2. In FIG. 3a the header 14 includes an angular portion 28 extending upwardly at an acute angle from the straight portion 19. The tube's outer surface 25 is coated with liquid silicone and cured to form a silicone coating 17. The diameter of the tube with the silicone coating is slightly larger then the diameter of the header 14 opening. The silicone coating and the inside of the header opening form a silicone joint 18. In FIG. 3b, the header 14 includes an angular portion 23 extending downwardly at an acute angle from the straight portion 19. Liquid silicone is applied to the outer surface of the tube 12 and then cured to form a silicone coating 17. The diameter of the tube 12 with the silicone coating is slightly larger than the diameter of the opening in the header 14. After the tube is inserted through the header opening, the silicone coating and the inside of the header opening form a silicone bonding joint 26.

The method shown in FIGS. 3a–3c includes using a cured-in-place seal by applying liquid silicone to the outer surface 25 of the tube 12, and curing the silicone to form a silicone coating around the tube 12. The diameter of the tube 12 is slightly larger than the diameter of the opening in the header 14. As the tube is inserted through the header opening, the silicone on the tube 12 is compressed between the outer surface 25 of the tube and the inside of the opening in the header 14 to form a silicone joint 18, 26 under compression fit.

Figure 4:
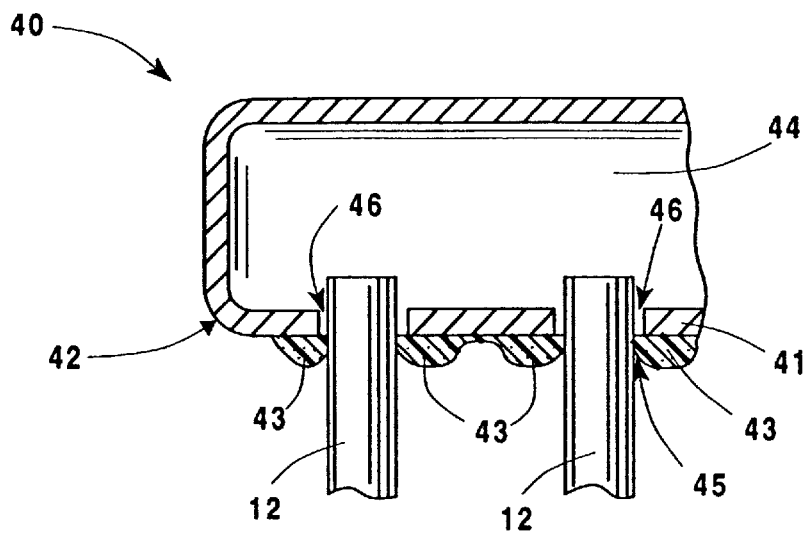
FIG. 4 is a partial cross-sectional view of another embodiment of the present invention having a manifold and using one of the sealing joints shown in FIGS. 1–3.

Referring to FIG. 4, a joint assembly 40 is shown which includes a one piece cast manifold 42 having a bottom portion 41 that acts as a header, and a tank portion connected to the header portion. The manifold can also be a fabricated manifold which is made by welding headers to cast or fabricated tanks. Molded plastic manifolds, either of one-piece or with crimped-on metal headers could be used on the low-temperature outlet side of a heat exchanger. All of the manifolds referred to include slightly oversized openings 46 in the header or header-like bottom portion of the one piece cast manifold which are designed to receive tubes 12. Liquid silicone can be applied to the underside of the manifold or header and cured before or after assembly to create cured-in-place or formed-in-place seals to form a silicone joint 45 between the manifold or header and the tube 12.

The method of the present invention, referring to FIG. 4 includes, in a process using cured-in-place seals, applying the liquid silicone to the bottom of the header 41, then curing-in-place the silicone to form silicone beads 43. The beads 43 define an opening slightly smaller than the diameter of the tube so that after the tube is inserted through the opening a compression fit joint 45 is formed between the tube and the header 41. Using a formed-in-place seal, the tube is inserted through the slightly oversized opening in the header 41. Liquid silicone is applied between the tube 12 and the header including on the bottom of the header 41, to form silicone beads 43. The joint 45 forms a bonded liquid tight seal between the header 41 and the tube 12.

Figure 5:
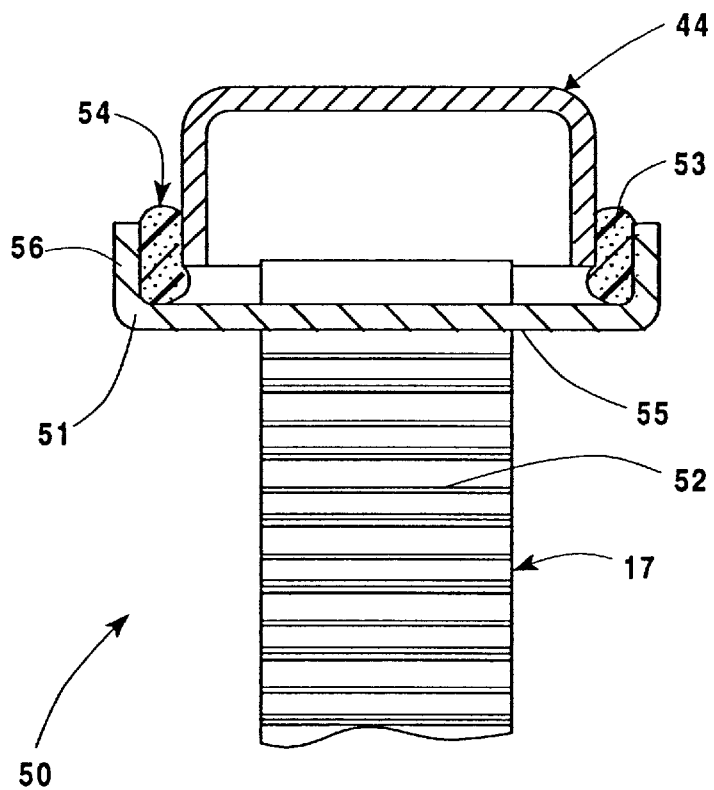
FIG. 5 is a partial cross-sectional view of another embodiment of the present invention depicting a tank-to-header sealing joint, a tube and fins.

Referring to FIG. 5, a joint assembly 50 is shown which includes a tank 44, and a header 51, and tubes 17 connected by brazed joints 55 to the header 51. The header is in a U-shape and receives the tank 44 such that a gap is defined between the upward extending portion 56 of the header and the tank 44. After assembly, liquid silicone is positioned between the upward extending portion 56 of the header 51 and the tank 44 resulting in silicone beads 53.

The method of the present invention, shown in FIG. 5, creates a flexible tank-to-header joint 54 by using a formed-in-place seal. The tank 44, the header 51 and the tubes 17 are assembled before applying the silicone. The header 51 and the tubes 17 are substantially rigidly fixed together. After assembly, the silicone 53 is applied in liquid form between the upward extending portion 56 of the header 51 and the tank 44 or by applying it to both (or to only one) of the adjacent surfaces of the header 51 and the tank 44. The liquid silicone material 53 is then cured by room temperature vulcanization (RTV) (ultraviolet light and/or heat can also be used) to form a silicone sealing joint 54.

The embodiment shown in FIG. 5 of the present invention, is a significant and material departure from current flexible tube-to-header joints. In a preferred embodiment, the tubes are fixedly attached to the header, and the header is resiliently attached to the tank. The present invention provides an advantage of having a flexible tank to header joint which will not crack or cause damage to any of the components when the header-tubes combination is moved or flexed, or the tank moves. The present invention, as illustrated in FIG. 5, provides a flexible joint between the tank 44 and the header 51 which allows for movement between the tank 44 and the header 51 having fixedly attached tubes 17. In a specific case, when the tank is secured to another structure limiting the tanks movement, the flexible joint 54 allows resilient movement between the tank 44 and the header 51 with fixedly attached tubes 17.

If the manifolds are welded or bolted to the side columns, the unit can be mounted by means of the tanks or the side columns. The brazed core is free to thermally expand and contract, or mechanically vibrate, independent of the tanks and side columns. Tube-to-header joints can be brazed with the rest of the core prior to bonding the tanks in place.

Figure 6:
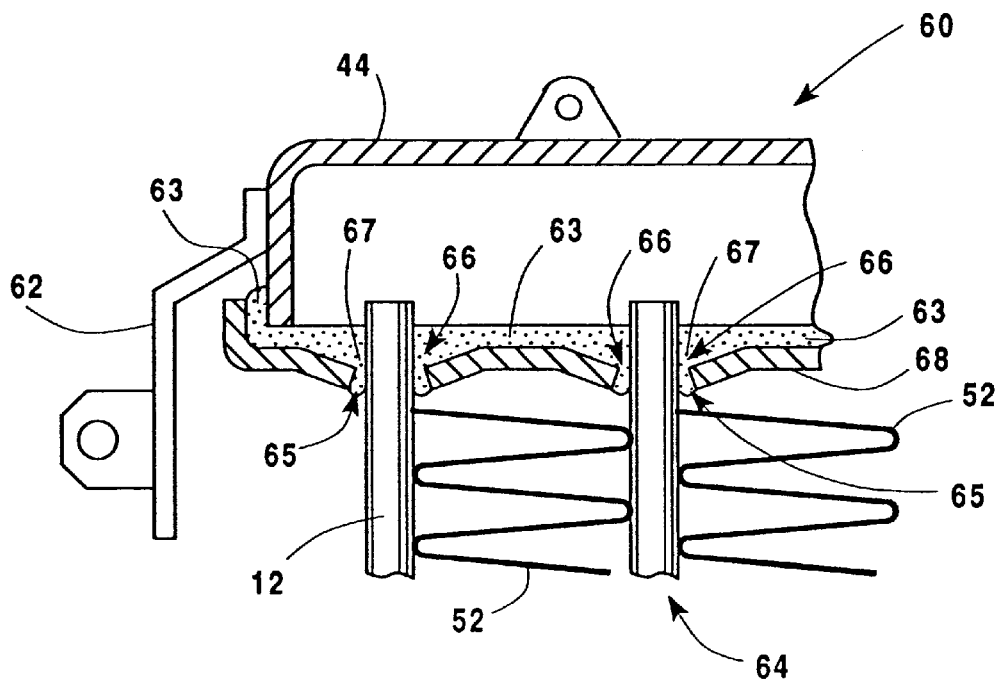
FIG. 6 is a partial cross-sectional view of another embodiment of the present invention depicting a header, a tank, a side column, tubes, fins, a header to tank sealing joint and header to core sealing joints.

Referring to FIG. 6, a joint assembly 60 is shown which includes a side column 62, a tank 44, curved header 68, tubes 12, and fins 52 of a core 64. The manifold 62 can be welded or bolted to a rigid structure side column 62 so that mounting can be accomplished. The curved header 68 defines wells 66 which provide slightly oversized holes designed to receive the tubes 12. The curved header arcs downwardly when adjacent to the tube openings. The arcing forms wells 66 between the header portions defining the wells 66. After the tubes are inserted, and liquid silicone is applied to create formed in place seals, the wells 66 in the header 41 provide a lengthened silicone bond 65 between the tubes 12 and the header 41 for better sealing. A thin layer of 600F RTV silicone 63 is over the entire header 41 which forms a bond between the header 41, the tank 44 and the tubes 12. The side column 62 is welded or bolted to a side of the tank 44 to form a rigid structure. The header and tank can flex with respect to each other while the resilient tube to header sealing joints 65 also flex.

The method of the present invention shown in FIG. 6, includes first assembling by slipping the header 68 over the tubes 12 of a headerless core 64. The header 68 and the wells 66 are flooded with liquid silicone (such as 600F RTV silicone) such that the wells fill up and a thin layer covers the header. The tank is then assembled to the header and the silicone is cured, resulting in silicone joints 65 providing a liquid tight seal between the tubes and the header, and a bond between the header and the tank 44.

An advantage of the embodiment shown in FIG. 6 is that the header is tolerant when accommodating the tubes because the silicone 63 readily forms the sealing joint 65. This eliminates the need to install and fit grommets because the sealing joint 65 provides a liquid tight fit between the tube 12 and the header 41. Further, because the need for the tubes of the core assembly 64 to precisely align with grommets is eliminated, core tolerances can be relaxed.

Figure 7:
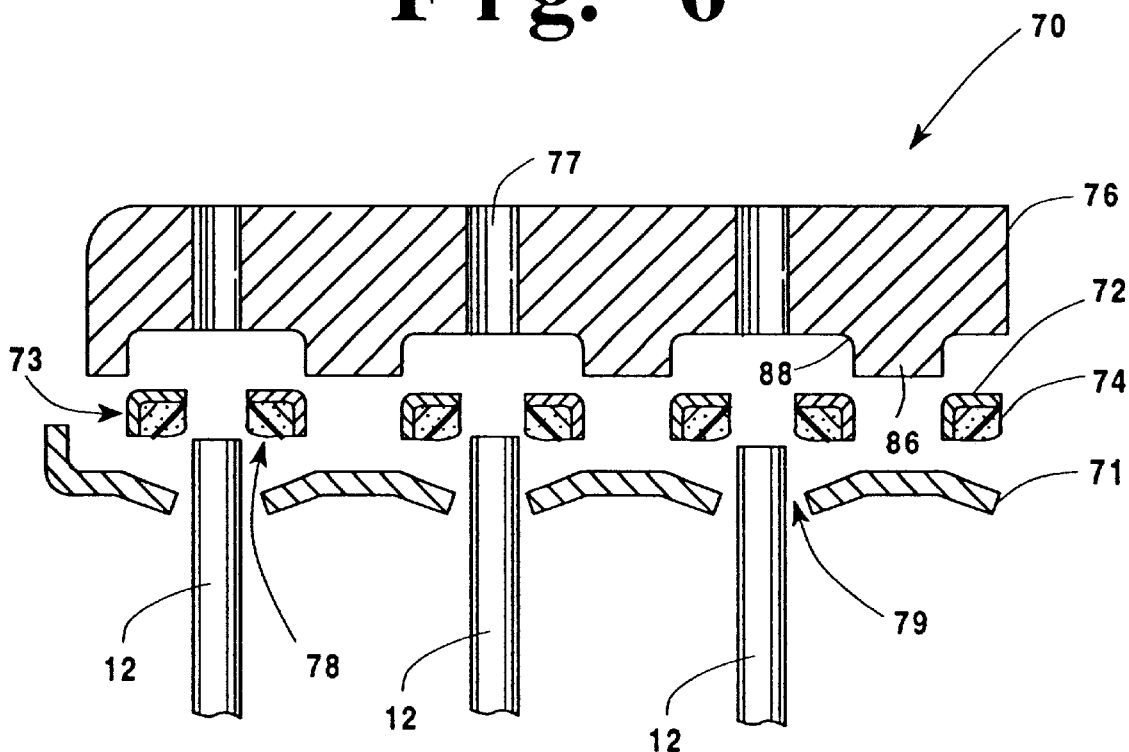
FIG. 7 is a partial cross-sectional view of another embodiment of the present invention showing a sealing joint formed between tubes and a header using a die.

Referring to FIG. 7, a joint assembly 70 is shown which includes tubes 12, a curved header 71, a die 76, and a silicone carrier 73 having a cured silicone portion 72, and uncured silicone portion 74. The uncured silicone portion 74 faces the header 71 and the tubes 12, while the cured portion 72 faces the die 76 and fits into the recessed portion 88 of the die. The uncured RTV silicone sealant 74 is used in the assembly of the tubes and the header on a carrier sheet of thin cured silicone rubber. The carrier contains a predetermined measured amount of RTV sealant. The silicone carrier 73 including RTV sealant is pre-made and is protected by a strip-off plastic film so that it can be easily handled and stored before its use. The adjacent curved header 71 portion form wells 78 and slightly oversized openings 79 designed to receive the tubes 12. The wells 78 provide a lengthened silicone bond formed between the tubes and header for better sealing.

The method of the present invention shown in FIG. 7 includes assembling the tubes through the openings 79 defined by the header 71. Then, the plastic protective film is stripped off the silicone carrier 73, which is placed onto the header, around the tubes, with the uncured RTV towards the metal parts, the tubes, and the header. The die 76 is forced down over the header 71 while accepting the tubes 12 in openings 77. The recessed portion 88 of the die 76 compresses the silicone carrier 73 ensuring that the RTV sealant is forced into the wells 78 around the tubes 12 by the desired amount. Stop portions 86 on the die 76 limit the compression. The silicone is then cured. The curing of the RTV silicone can be accomplished with heat, moisture or U/V radiation. This method controls the amount of RTV applied to the joints, more accurately controls where it is placed, and provides a quick and clean method of RTV application.

Figure 8:
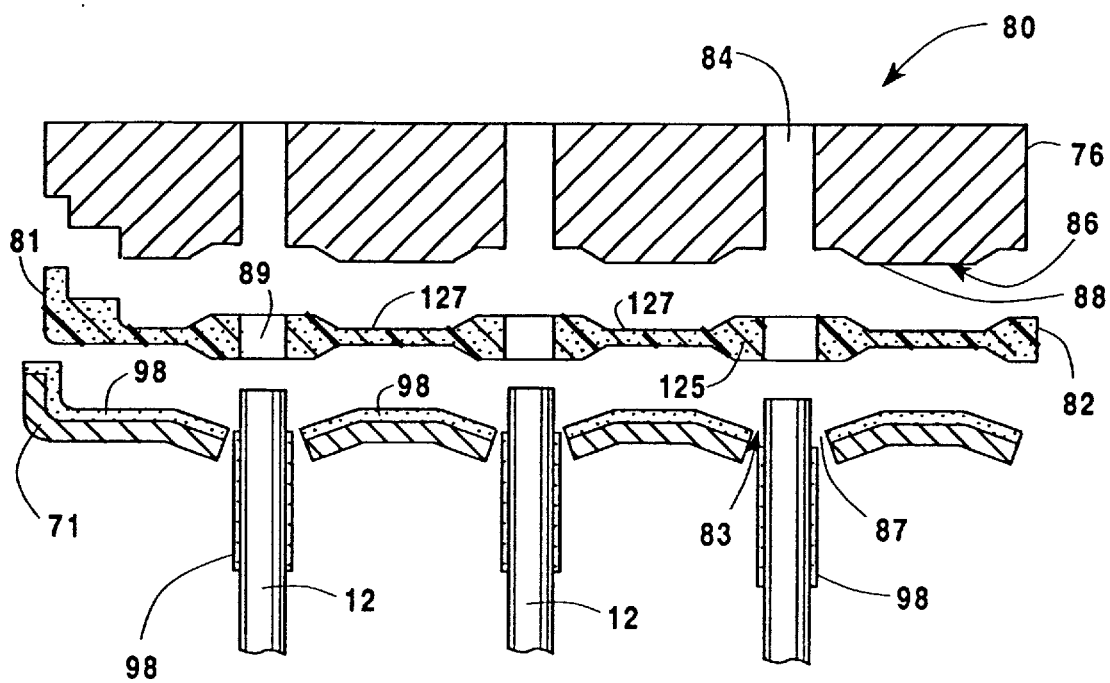
FIG. 8 is a partial cross-sectional view of another embodiment of the present invention depicting the forming of a sealing joint between tubes and a header using a bonding strip and a die.

Referring to FIG. 8, a joint assembly 80 is shown which includes a die 76, tubes 12, a header, and a pre-molded and cured silicone rubber bonding strip 82. The bonding strip includes an extended portion 127, and a bulbous portion 125. The bulbous portion is positioned adjacent to the tubes 12 such that the bulbous portion 125 forms the silicone joint between the header 71 and the tube 12. The step portion 81 molded into the edge of the bonding strip provides for the automatic location of the tank/manifold 44. The die 76 includes a stop portion 86 and recessed portion 88. The curved header 71 defines the wells 83, which after receiving the tubes and applying the silicone, lengthen the silicone bond formed between the tubes and header for better sealing. A silicone bonding adhesive coating 98 is applied to surfaces to be bonded, the upper surface of the header 71, the outer surface of the tubes 12, and to the bottom surface of a tank/manifold 44.

Figure 9:
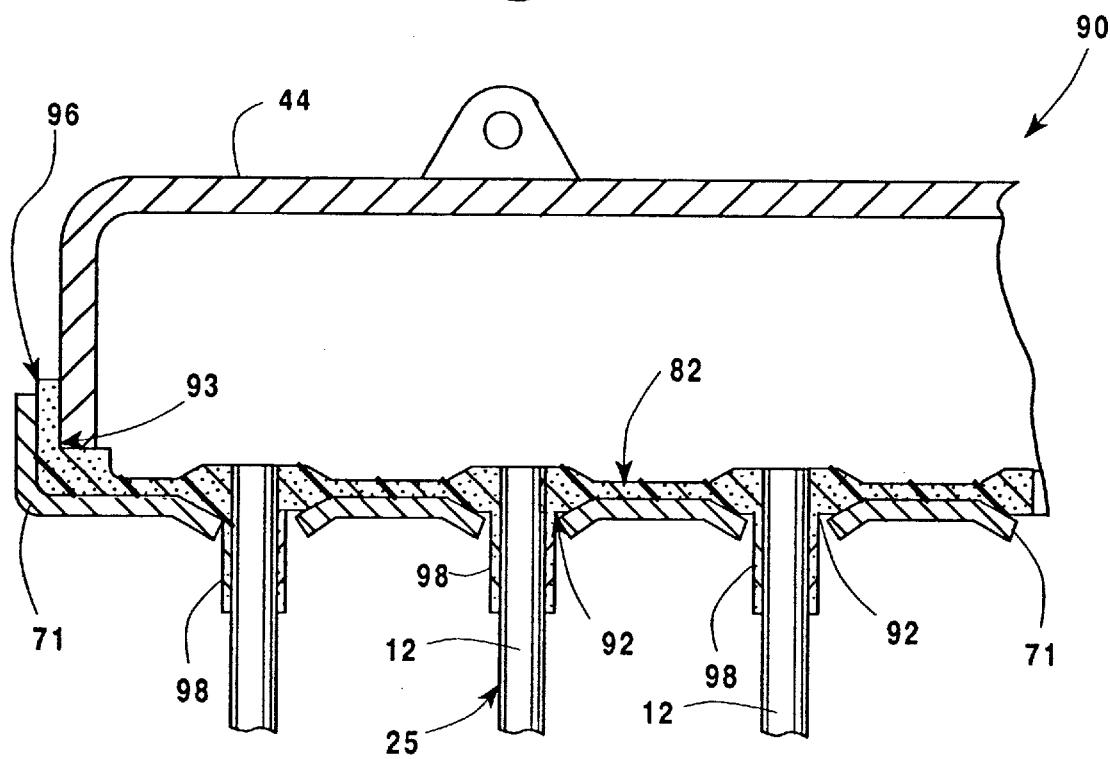
FIG. 9 is a partial cross-sectional view of the same embodiment as shown in FIG. 8 depicting the bonding strip in place.

Referring to FIG. 9, the embodiment of the present invention shown in FIG. 8 is shown assembled. During assembly step portion 81 molded into the edge of the bonding strip assists in automatic location of the tank/manifold 44. The silicone sealing portion 92 is between the tube and the header 71. The step portion 81 of the bonding strip is between the tank/manifold 44 and the header 71 to provide a seal 93. Additionally, a further tank/manifold 44 to header 71 bond may be created by applying a formed in place RTV silicone seal 96.

The method of the present invention, shown in FIGS. 8 and 9, includes the tubes and header assembly being aligned with the bonding strips such that the tubes are inserted through holes 89 in the bonding strip and openings 84 in the die. Prior to applying the bonding strip 82, the parts to be bonded are coated with silicone bonding adhesive 98. The tubes are inserted through the opening 87 in the header 71 and then the bonding strip 82 is placed over the header such that the openings 89 in the bonding strip accept the tubes 12. The die 76 forces the bonding strip into place on the header 71 and the silicone bonding adhesive 98 around the tubes 12 as the bonding strip is compressed by the recessed portion 88 of the die 76. The silicone bonding strip 82 is compressed between the header 71 and the tubes 12. Stop portions 86 on the die 76 limit the compression, as in the embodiment shown in FIG. 7. The silicone bonding adhesive 98 is then cured under heat and pressure. The die is removed and the tank 44 is positioned using the step portion 81 as a guide. The portion of the tank which meets the silicone bonding strip can be coated with liquid silicone bonding adhesive. The coating of silicone bonding adhesive 98 on the outer surfaces 25 of the tubes 12, the upper surface of the header and bottom surface of the tank 44 meets with the bonding strip to enhance sealing. Bonding may be enhanced by curing the silicone adhesive which bonds the bonding strip to the tubes and header under heat and pressure. The method shown in FIGS. 8 and 9 provides the cleanest possible assembly of parts by eliminating the need for large amounts of uncured RTV in the tube-to-header joint areas.

Figure 10:
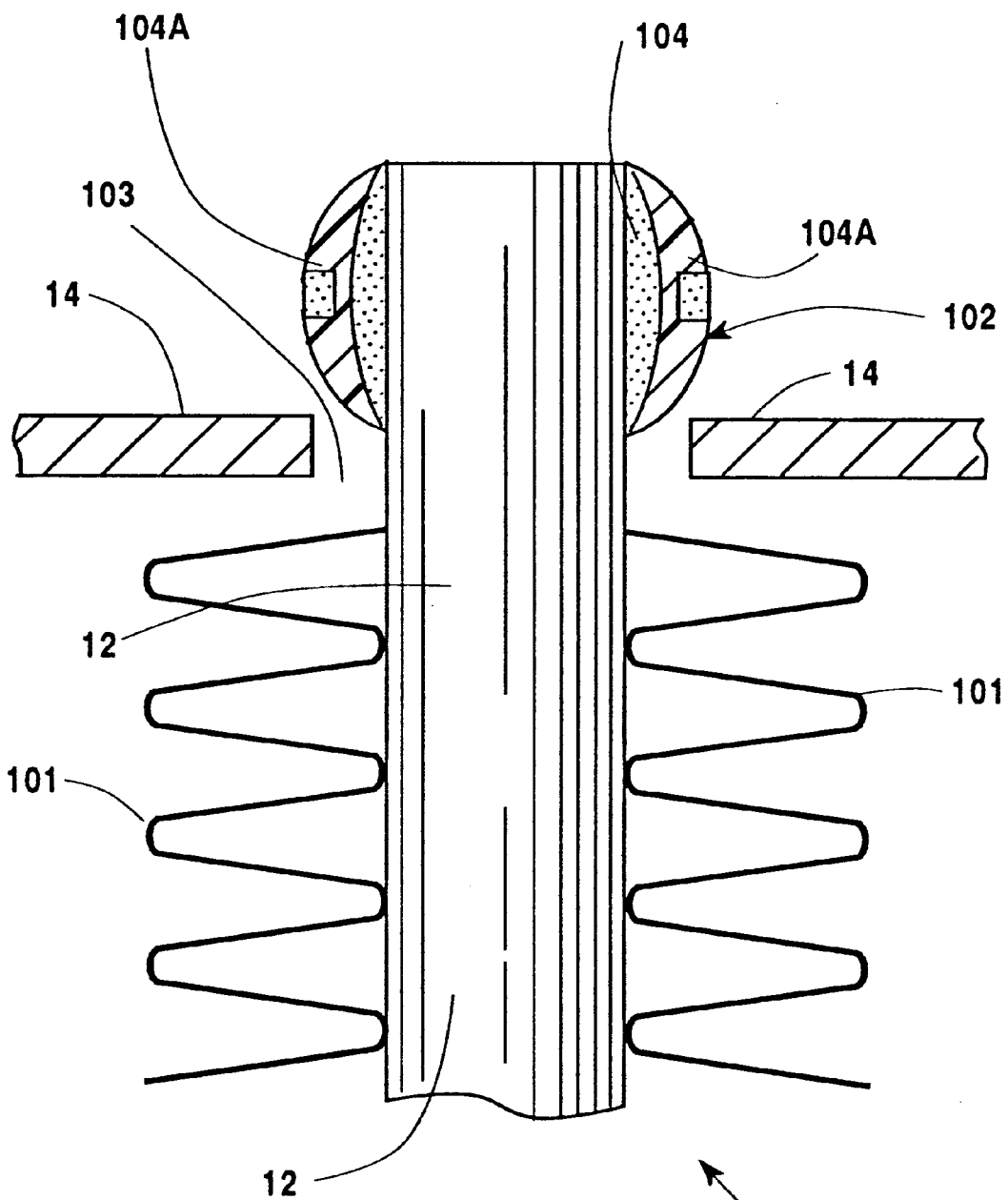
FIG. 10 is a partial cross-sectional view of another embodiment of the present invention showing a sealing joint formed between a tube, header, and a grommet.
Figure 11:
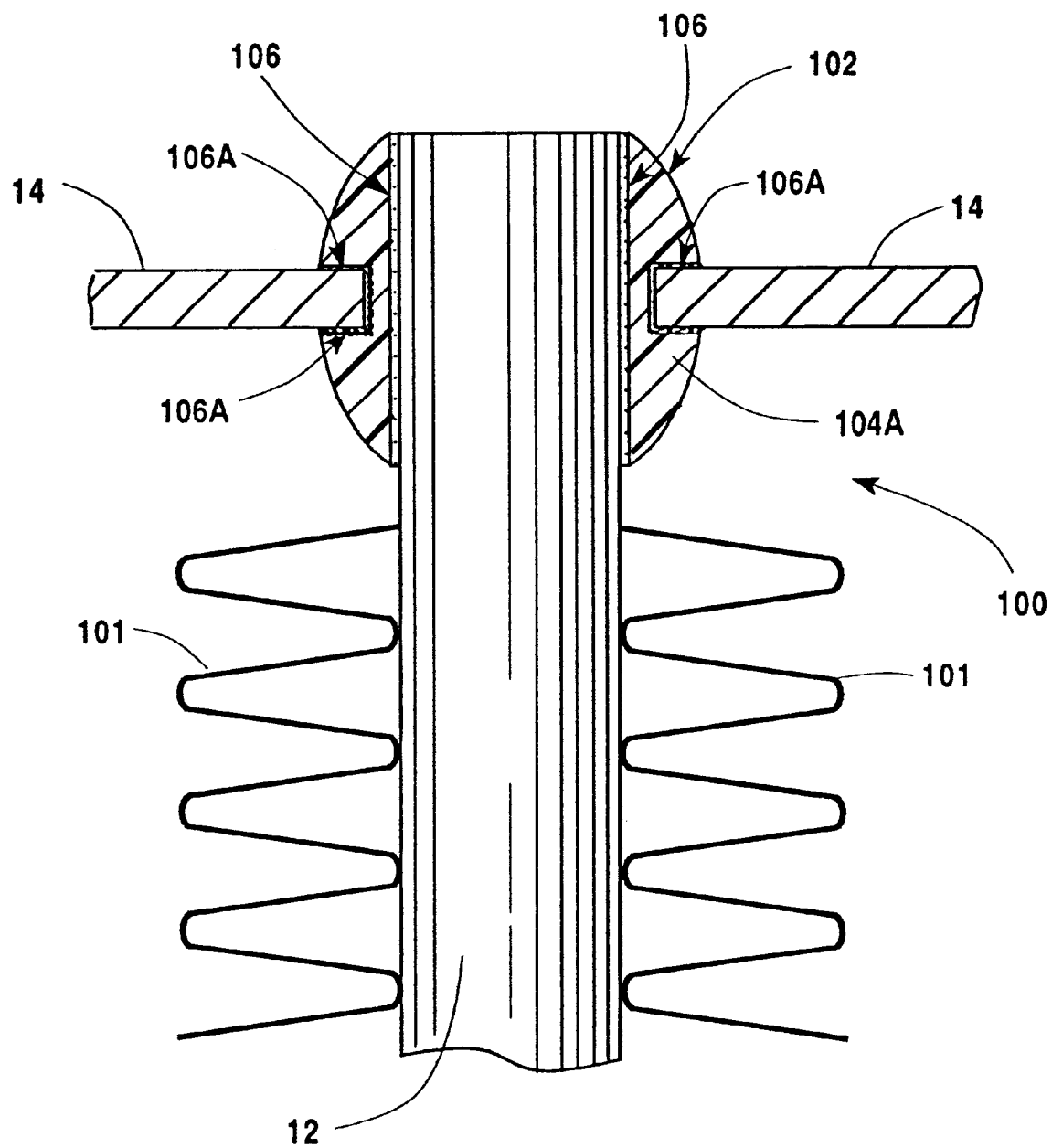
FIG. 11 is partial cross-sectional view illustrating assembled the embodiment shown in FIG. 10.

Referring to FIGS. 10–11, a joint assembly 100 is shown which includes a tube 12 surrounded by fins 101, a header 14, and a grommet 102 having an opening to receive one end of the tube 12. The grommet includes a cured silicone rubber outer portion 102 housing a silicone bonding adhesive inner portion 104 and a silicone bonding adhesive outer portion 104A. The inner portion 104 is adjacent to the inserted tube 12. The outer portion 104A is adjacent to the header 14. The header defines an opening 103 which is slightly larger then the tube 12 diameter. The grommet 102 is composed of cured high temperature silicone rubber which is shaped to retain an application of silicone bonding adhesive 104 and 104A. RTV silicone is one example of a silicone bonding adhesive that can be used in the present invention. The grommet may then be inserted in the header opening 103, followed by the tube 12 being inserted through the grommet 102 in the header. The grommet may also be slipped onto the tube and then forced into place in the header opening. In either case, when the silicone bonding adhesive 104 and 104A is cured, by moisture, heat, Ultra-Violet radiation or other means, the grommet becomes bonded to both the tube and the header, providing a resilient, leak-free tube-to-header joint 106, shown in FIG. 11.

The method of the present invention, as shown in FIGS. 10 and 11, includes inserting the grommet over the tube or inserting the grommet into the header opening 103 and then inserting the tube through the grommet. The portions 104 and 104A of the grommet are then cured, resulting in a silicone sealing joint 106 between the grommet 102 and the tube 12 and a silicone sealing joint 106A between the grommet 102 and the header 14.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of making a heat exchanger comprising the steps of:
   providing a header defining openings having inner surfaces, said header openings adapted to receive a plurality of tubes having outer surfaces;
   applying substantially uncured fluid sealing material to at least said inner surfaces of said header openings;
   curing said sealing material before said tubes are inserted into said header openings, said sealing material providing elastomeric members bonded to said inner surfaces of said header openings adapted to receive said tubes; and
   inserting said tubes into said header openings such that said inner surfaces of said header openings and said outer surfaces of said tubes are adjacent to each other and are connected by said elastomeric members to provide a flexible, liquid tight, tube-to-header joint.

2. The method of claim 1 wherein said elastomeric members are compressed by said tubes to provide a flexible, liquid tight, tube-to-header joint.

3. The method of claim 1 wherein an inside dimension of said elastomeric members is determined during curing using a mandrel.

4. The method of claim 1 wherein in the step of curing said sealing material includes room temperature vulcanization.

5. The method of claim 1 wherein in the step of curing said sealing material includes ultraviolet light.

6. The method of claim 1 wherein said elastomeric member includes an internal dimension being defined and formed using a Teflon mandrel, said internal dimension being less than an outer dimension of said tube providing a compression sealing fit between said elastomeric member and said tube.

7. A heat exchanger which comprises:
   a header defining openings having inner surfaces, said header openings adapted to receive a plurality of tubes, and said tubes being inserted through said header openings; and
   a cured-in-place seal between said tubes and said inner surfaces of said header openings, said seal being bonded to said header, and said seal providing an elastomeric compression sealing fit between said rube and said seal.

8. The heat exchanger according to claim 7 further comprising a tank integral with said header.

9. The heat exchanger according to claim 7 wherein said cured-in-place seal includes an internal dimension smaller than an outer dimension of said tubes, as measured prior to assembly and compression, to provide said compression sealing fir between said tubes and said cured-in-place seal.

10. The heat exchanger according to claim 9 wherein said internal dimensions of said cured-in-place seal is formed using a Teflon™ mandrel.

11. A heat exchanger which comprises:
   a header defining openings, said header openings adapted to receive a plurality of tubes, and said tubes being inserted through said header openings; and
   a cured-in-place seal between said tubes and said inner surfaces of said header openings, said seal being bonded to said tube, and said seal providing an elastomeric compression sealing fir between said header and said seal.

12. A The heat exchanger according to claim 11 further comprising a tank being integral with said header.

13. The heat exchanger according to claim 11 wherein said cured-in-place seal comprises silicone.

14. The heat exchanger of claim 11 wherein said cured-in-place seal is bonded to said tube and not to said header.

* * * * *

UNITED STATES PATENT AND TRADEMARK OFFICE
CERTIFICATE OF CORRECTION

PATENT NO. : 6,719,037 B2
DATED : April 13, 2004
INVENTOR(S) : Crook

It is certified that error appears in the above-identified patent and that said Letters Patent is hereby corrected as shown below:

Column 14,
Line 18, delete "rube" and substitute therefor -- tube --.
Line 39, delete "fir" and substitute therefor -- fit --.
Line 41, delete "A".

Signed and Sealed this

Twenty-fourth Day of August, 2004

JON W. DUDAS
*Director of the United States Patent and Trademark Office*